(12) United States Patent
Yamazaki et al.

(10) Patent No.: US 9,622,222 B2
(45) Date of Patent: Apr. 11, 2017

(54) MOBILE COMMUNICATION SYSTEM, BASE STATION, AND USER TERMINAL

(71) Applicant: KYOCERA CORPORATION, Kyoto (JP)

(72) Inventors: Chiharu Yamazaki, Ota-ku (JP); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 31 days.

(21) Appl. No.: 15/059,666

(22) Filed: Mar. 3, 2016

(65) Prior Publication Data

US 2016/0192342 A1 Jun. 30, 2016

Related U.S. Application Data

(63) Continuation of application No. 14/348,590, filed as application No. PCT/JP2011/072475 on Sep. 29, 2011, now Pat. No. 9,306,661.

(51) Int. Cl.

| | |
|---|---|
| *H04J 1/00* | (2006.01) |
| *H04W 72/04* | (2009.01) |
| *H04B 7/26* | (2006.01) |
| *H04W 36/28* | (2009.01) |
| *H04L 5/14* | (2006.01) |
| *H04W 28/02* | (2009.01) |
| *H04W 84/04* | (2009.01) |

(52) U.S. Cl.
CPC ...... *H04W 72/0406* (2013.01); *H04B 7/2621* (2013.01); *H04L 5/14* (2013.01); *H04W 28/0236* (2013.01); *H04W 36/28* (2013.01); *H04W 84/045* (2013.01)

(58) Field of Classification Search
CPC .......................................................... H04J 1/00
See application file for complete search history.

(56) References Cited

U.S. PATENT DOCUMENTS

| 8,908,560 B2 | 12/2014 | Maeda et al. | |
|---|---|---|---|
| 2011/0149898 A1* | 6/2011 | Kim | H04L 5/001 370/329 |

(Continued)

FOREIGN PATENT DOCUMENTS

| JP | 2008-072563 A | 3/2008 |
|---|---|---|
| JP | 2011-124713 A | 6/2011 |

(Continued)

OTHER PUBLICATIONS

An Office Action; "Notice of Reasons for Rejection," issued by the Japanese Patent Office on Mar. 24, 2015, which corresponds to Japanese Patent Application No. 2013-535755 and is related to U.S. Appl. No. 14/348,590; with English language statement of relevance.

(Continued)

*Primary Examiner* — Chi H Pham
*Assistant Examiner* — Raul Rivas
(74) *Attorney, Agent, or Firm* — Studebaker & Brackett PC

(57) ABSTRACT

In a mobile communication system that employs a FDD scheme, a HeNB (100-1) and a UE (200-1) use a pair of a UL CC and a DL CC for radio communication. The HeNB (100-1) and the UE (200-1) change the UL CC of the pair of the UL CC and the DL CC to another CC while maintaining the DL CC during execution of the radio communication.

6 Claims, 6 Drawing Sheets

(56) References Cited

U.S. PATENT DOCUMENTS

| | | | |
|---|---|---|---|
| 2011/0292915 A1* | 12/2011 | Prakash | H04L 5/0098 370/336 |
| 2012/0087314 A1 | 4/2012 | Maeda et al. | |
| 2012/0300701 A1 | 11/2012 | Uemura et al. | |
| 2013/0039306 A1 | 2/2013 | Umesh et al. | |
| 2013/0308443 A1 | 11/2013 | Uemura et al. | |
| 2015/0055607 A1 | 2/2015 | Maeda et al. | |

FOREIGN PATENT DOCUMENTS

| | | |
|---|---|---|
| JP | 2011-166712 A | 8/2011 |
| WO | 2010/146835 A1 | 12/2010 |

OTHER PUBLICATIONS

International Search Report; PCT/JP2011/072475; Nov. 15, 2011.
3GPP TS 36.300 V10.4.0 (Jun. 2011); 3rd Generation Partnership Project; Technical Specification Group Radio Access letwork; Evolved Universal Terrestrial Radio Access (E-UTRA) and Evolved Universal Terrestrial Radio Access Network (E-UTRAN); Overall description; Stage 2 (Release 10); pp. 1-194.

* cited by examiner

MOBILE COMMUNICATION SYSTEM, BASE STATION, AND USER TERMINAL

TECHNICAL FIELD

The present invention relates to a mobile communication system employing a FDD scheme, a base station, and a user terminal.

BACKGROUND ART

In 3GPP (3rd Generation Partnership Project) which is a project aiming to standardize a mobile communication system, the standardization of an LTE Advanced, which is a sophisticated version of LTE (Long Term Evolution), is conducted after 3GPP Release 10.

The LTE and the LTE Advanced may employ frequency division duplex (FDD) or time division duplex (TDD).

Furthermore, the LTE and the LTE Advanced introduce a home base station that is a small base station provided to a home or a company (refer to Non-Patent Literature 1). To impose a connection restriction, the home base station may constitute a CSG (Closed Subscriber Group) cell connectable by a specific user only.

Moreover, the LTE Advanced introduces carrier aggregation, in which carriers (frequency bands) in the LTE are positioned as component carriers and a combination of a plurality of carriers is used for radio communication, in order to achieve a wider band while ensuring backward compatibility with the LTE (refer to Non-Patent Literature 1).

PRIOR ART DOCUMENT

Non-Patent Document

Non-Patent Document 1: 3GPP Technical Specification TS 36.300 V10.4.0

SUMMARY OF THE INVENTION

However, the home base station may be arbitrarily installed by a user differently from a macro base station installed by cell site design of an operator, resulting in a cause of inter-base station interference.

In this regard, after the 3GPP Release 11, there is a desire to provide a scheme of avoiding inter-base station interference by applying the aforementioned carrier aggregation.

Therefore, the present invention provides a mobile communication system capable of avoiding inter-base station interference, a base station, and a user terminal.

According to an aspect of the present invention, a mobile communication system that employs a frequency division duplex scheme, comprising: a user terminal; and a base station that uses at least a pair of uplink and downlink carriers for radio communication with the user terminal, wherein the base station and the user terminal change the uplink carrier of the pair of uplink and downlink carriers to another carrier during execution of the radio communication is provided.

According to another aspect of the present invention, the base station transmits uplink carrier information indicating the other carrier before changing the uplink carrier, and the user terminal receives the uplink carrier information from the base station.

According to the other aspect of the present invention, the base station transmits the uplink carrier information into a message specific to each user terminal.

According to the other aspect of the present invention, the base station transmits the uplink carrier information into an information block common to a plurality of user terminals.

According to the other aspect of the present invention, the base station transmits the uplink carrier information, and thereafter changes the uplink carrier to the other carrier at a timing decided in advance, and the user terminal receives the uplink carrier information, and thereafter changes the uplink carrier to the other carrier at the timing decided in advance.

According to the other aspect of the present invention, the base station transmits timing information indicating a timing at which the uplink carrier is changed, before changing the uplink carrier, and the user terminal receives the timing information from the base station.

According to the other aspect of the present invention, the base station transmits the timing information, and thereafter changes the uplink carrier to the other carrier at a timing corresponding to the timing information, and the user terminal receives the timing information, and thereafter changes the uplink carrier to the other carrier at the timing corresponding to the timing information.

According to the other aspect of the present invention, the base station and the user terminal change the uplink carrier to the other carrier while maintaining a bandwidth of the uplink carrier during execution of the radio communication.

According to the other aspect of the present invention, the base station and the user terminal change the uplink carrier to the other carrier while maintaining the bandwidth of the uplink carrier and context correlated with the uplink carrier during execution of the radio communication.

According to the other aspect of the present invention, the base station and the user terminal change the uplink carrier to the other carrier while maintaining the downlink carrier of the pair of uplink and downlink carriers during execution of the radio communication.

According to the other aspect of the present invention, the base station and the user terminal change the uplink carrier to the other carrier while maintaining the downlink carrier and context correlated with the downlink carrier.

According to an aspect of the present invention, a base station that uses at least a pair of uplink and downlink carriers for radio communication with a user terminal in a mobile communication system that employs a frequency division duplex scheme, wherein the uplink carrier of the pair of uplink and downlink carriers is changed to another carrier during execution of the radio communication is provided.

According to an aspect of the present invention, a user terminal that uses at least a pair of uplink and downlink carriers for radio communication with a base station in a mobile communication system that employs a frequency division duplex scheme, wherein the uplink carrier of the pair of uplink and downlink carriers is changed to another carrier during execution of the radio communication is provided.

DESCRIPTION OF THE EMBODIMENT

Figure 1:
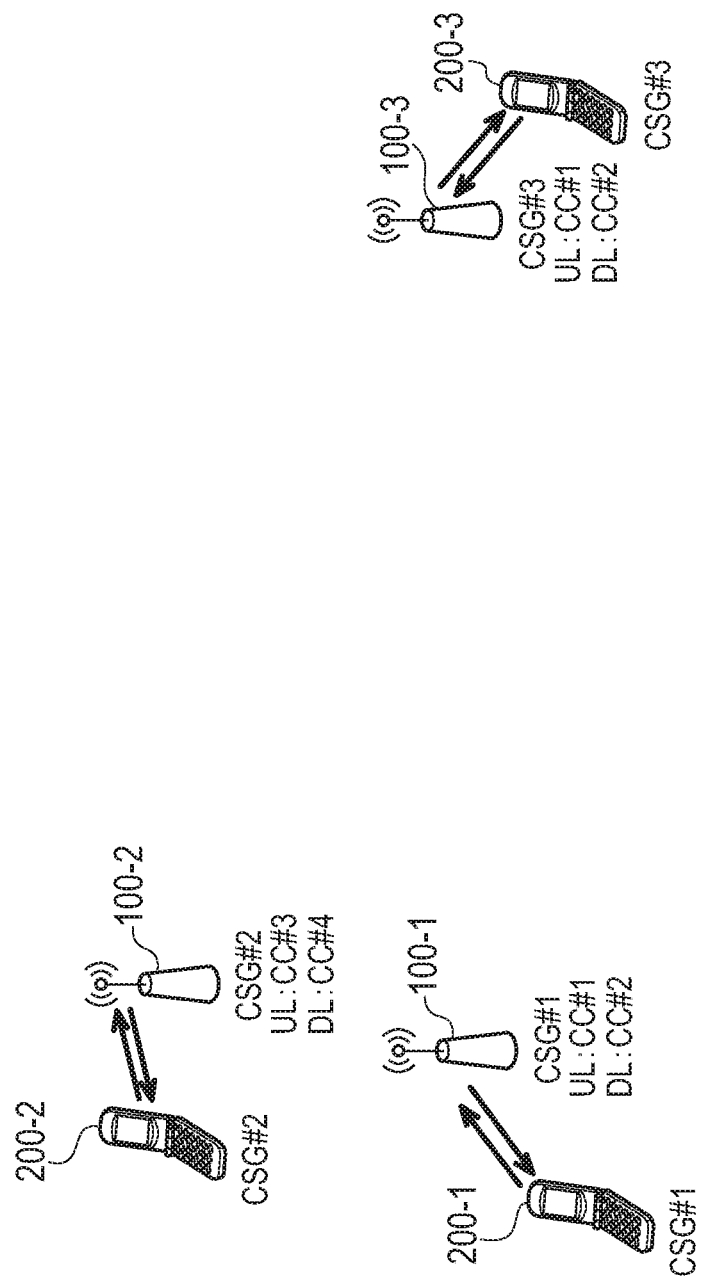
FIG. 1 is a diagram showing an entire configuration of a mobile communication system according to a first embodiment to a third embodiment.

A first embodiment through a third embodiment and other embodiments of the present invention are explained with reference to drawings. In the drawings of each of the embodiments shown below, the same or similar symbols have been used in the same or similar portions.

[First Embodiment]

FIG. 1 is a diagram showing an entire configuration of a mobile communication system according to the present embodiment. The mobile communication system according to the present embodiment is configured on the basis of LTE-Advanced having specifications designed in 3GPP, and employs a FDD scheme. Furthermore, the mobile communication system according to the present embodiment introduces carrier aggregation in which a combination of a plurality of component carriers (CCs) is used for radio communication. In addition, each CC includes a plurality of resource blocks (RBs) that are resource assignment units.

As shown in FIG. 1, the mobile communication system according to the present embodiment includes a plurality of home base stations (Home evolved Node Bs: HeNBs) 100 and a plurality of user terminals (User Equipments: UEs) 200. In the present embodiment, as with an office environment and the like, an environment, in which a plurality of HeNBs 100 with different CSGs are installed, is assumed. HeNB 100-1 constitutes a CSG cell of CSG#1, HeNB 100-2 constitutes a CSG cell of CSG#2, and HeNB 100-3 constitutes a CSG cell of CSG#3.

Each of the HeNB 100 monitors a radio signal that is transmitted and received around each of the HeNB 100 when power is supplied, thereby determining CC that is used around each of the HeNB 100. Then, each of the HeNB 100 decides CC, which is different from the CC used around each of the HeNB 100, as CC to be used in each HeNB.

The HeNB 100-1 and the HeNB 100-2 are installed adjacent to each other. Thus, for radio communication, the HeNB 100-1 and the HeNB 100-2 use CCs different for each uplink (UL) and each downlink (DL). Specifically, the HeNB 100-1 uses CC#1 in the UL and CC#2 in the DL. On the other hand, the HeNB 100-2 uses CC#3 in the UL and CC#4 in the DL.

UE 200-1 belongs to the CSG#1 and is connected to the HeNB 100-1. That is, the UE 200-1 employs the CSG cell constituted by the HeNB 100-1 as a serving cell. The UE 200-1 performs radio communication with the HeNB 100-1 by using the CC#1 in the UL and the CC#2 in the DL.

Furthermore, UE 200-2 belongs to the CSG#2 and is connected to the HeNB 100-2. That is, the UE 200-2 employs the CSG cell constituted by the HeNB 100-2 as a serving cell. The UE 200-2 performs radio communication with the HeNB 100-2 by using the CC#3 in the UL and the CC#4 in the DL.

The HeNB 100-3 is installed remote from the HeNB 100-1 and the HeNB 100-2. Thus, the HeNB 100-3 determines that no CC is used around the HeNB 100-3 through the aforementioned monitoring, and arbitrarily decides CC to be used in the HeNB. As a consequence, similarly to the HeNB 100-1, the HeNB 100-3 uses the CC#1 in the UL and the CC#2 in the DL.

UE 200-3 belongs to the CSG#3 and is connected to the HeNB 100-3. That is, the UE 200-3 employs the CSG cell constituted by the HeNB 100-3 as a serving cell. The UE 200-3 performs radio communication with the HeNB 100-3 by using the CC#1 in the UL and the CC#2 in the DL.

When the HeNB 100 and the UE 200 are in the positional relation as shown in FIG. 1, no interference occurs in any one of the UL and the DL. However, in an environment in which a plurality of HeNBs 100 with different CSGs are installed, there is a case in which the UE 200 is not allowed to connect to a neighboring HeNB 100 and is forced to connect to a remote HeNB 100 to which the UE 200 is allowed to connect, and in this case, interference occurs in the UL.

Figure 2:
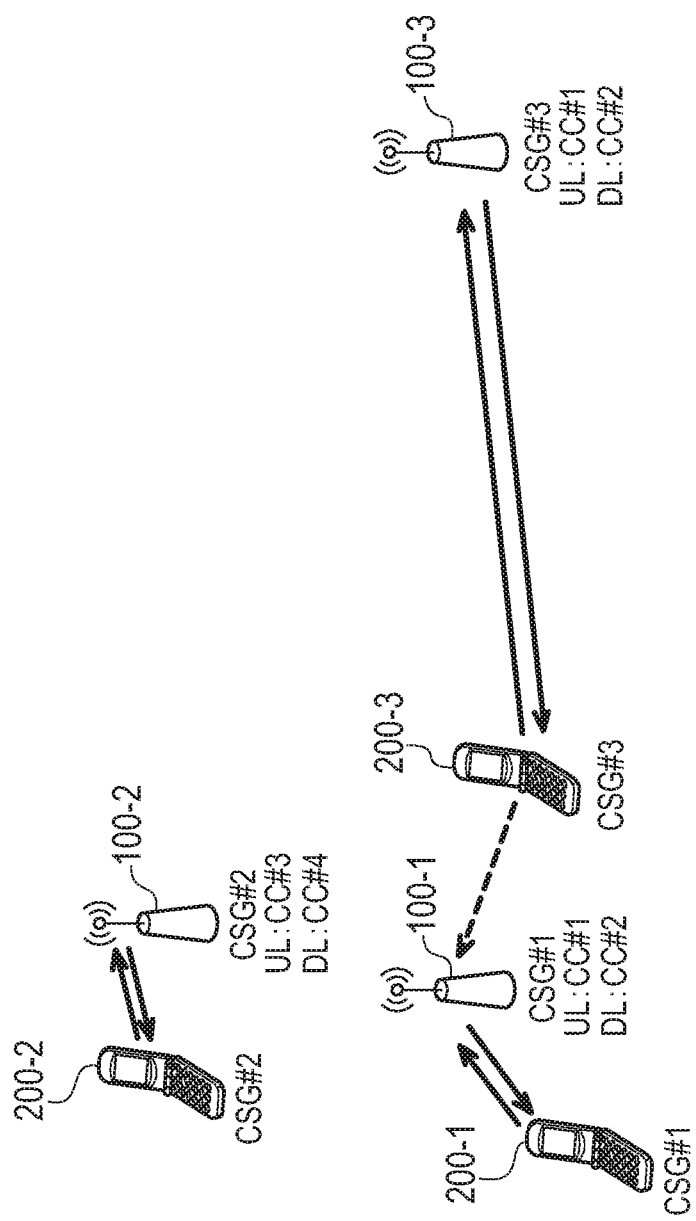
FIG. 2 is a diagram for explaining the case in which interference occurs in UL.

FIG. 2 is a diagram for explaining the case in which interference occurs in the UL. As shown in FIG. 2, the UE 200-3 belonging to the CSG#3 is located in the vicinity of the HeNB 100-1 and is located remote from the HeNB 100-3. A radio state of the UE 200-3 is not good, but is connected to the remote HeNB 100-3 to which the UE 200-3 is allowed to connect.

A UL signal from the UE 200-3 to the HeNB 100-3 is received in the HeNB 100-1 as well as the HeNB 100-3. Furthermore, the HeNB 100-3 and the UE 200-3 use the CC#1 in the UL similarly to the HeNB 100-1 and the UE200-1. Thus, the UL signal from the UE 200-3 to the HeNB 100-3 gives strong interference to the HeNB 100-1. As a consequence, the HeNB 100-1 is not able to normally receive a UL signal from the UE 200-1, so that radio communication between the HeNB 100-1 and the UE 200-1 is interrupted.

In this regard, in the present embodiment, when interference in the UL is detected during radio communication, the HeNB 100-1 and the UE 200-1 change CC (hereinafter, called "UL CC") used in the UL from the CC#1 to another CC (for example, a CC#5). As a result, the interference in the UL is avoided. Furthermore, a bandwidth of the UL CC after the change is allowed to be the same as that of the UL CC before the change, so that it is possible to maintain context correlated with the UL CC even when the UL CC is changed. A detailed example of the context correlated with the UL CC will be described later.

Even when the UL CC is changed, the HeNB 100-1 and the UE 200-1 maintain CC (hereinafter, called "DL CC") used in the DL without a change. As a result, it is possible to maintain the DL CC decided by a relation with the surroundings through the aforementioned monitoring and the UE 200-1 has no necessity of performing a reconnection. Furthermore, it is possible to maintain context correlated with the DL CC. A detailed example of the context correlated with the DL CC will be described later.

Figure 3:
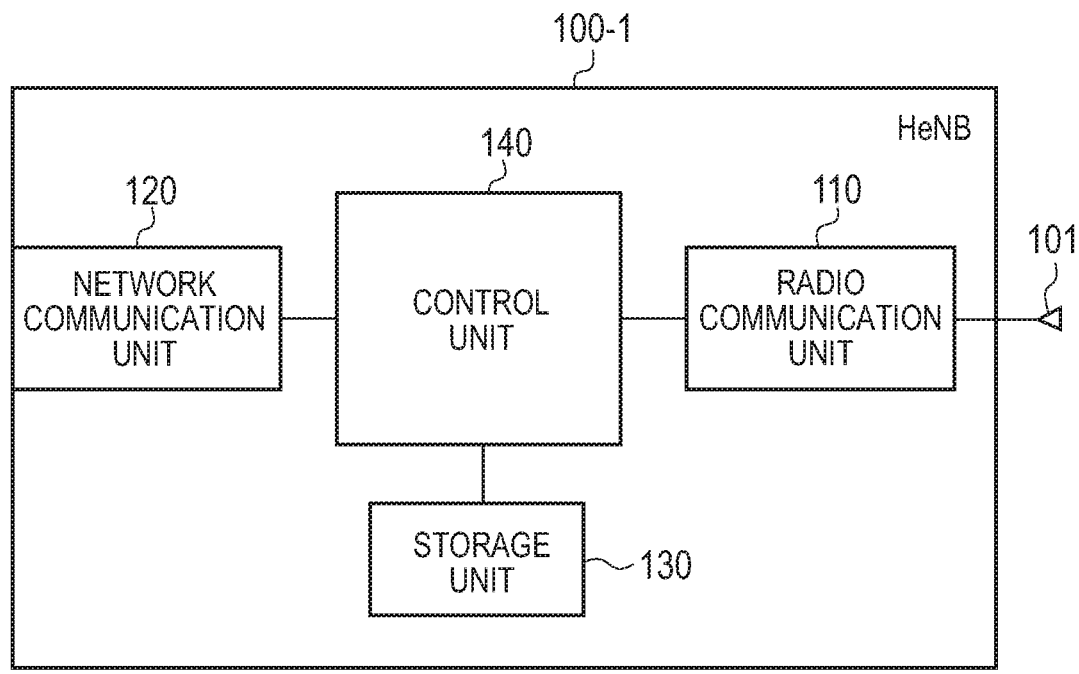
FIG. 3 is a block diagram of HeNB according to the first embodiment to the third embodiment.

Next, the configuration of the HeNB 100 will be described. Since the HeNB 100-1 to the HeNB 100-3 have the same configuration, the configuration of the HeNB 100-1 will be described below. FIG. 3 is a block diagram of the HeNB 100-1.

As shown in FIG. 3, the HeNB 100 includes an antenna 101, a radio communication unit 110, a network communication unit 120, a storage unit 130, and a control unit 140.

The radio communication unit 110 is configured to perform radio communication via the antenna 101. For transmission, the radio communication unit 110 performs up-conversion, amplification and the like, on a baseband signal input from the control unit 140, and outputs a radio signal from the antenna 101. For reception, the radio communication unit 110 performs amplification, down-conversion and the like, on a received signal input from the antenna 101, and then outputs a baseband signal to the control unit 140.

The network communication unit 120 communicates with a core network (Evolved Packet Core: EPC) by using the S1 interface. Furthermore, the network communication unit 120 performs communication (inter-base station communication) with another HeNB by using the X2 interface.

The storage unit 130 is configured by using a memory, for example, and stores various types of information items used for control and the like by the control unit 140. The storage unit 130 stores information on each CC (the CC#1 to CC#N) available in the mobile communication system, for example, information on a center frequency of each CC (the CC#1 to CC#N), a bandwidth of each CC (the CC#1 to CC#N) and the like.

The storage unit 130 stores context related to radio communication with the UE 200-1. Specifically, the storage unit 130 stores, as context (that is, context correlated with UL CC) related to UL communication with the UE 200-1, a state of HARQ (Hybrid Automatic Repeat ReQuest), setting of semi-persistent scheduling (SPS), setting of TTI (Transmission Time Interval) bundling, setting of SRS (Sounding Reference Signal), setting of PUCCH (Physical Uplink Control Channel) and the like.

In this case, the HARQ is obtained by combining automatic retransmission request (ARQ) and forward error correction (FEC), and the state of the HARQ, for example, indicates a soft buffer, the number of transmissions up to now and the like of data in the middle of reception (data failed in reception) from UE when the UE has a plurality of HARQ entities.

The SPS indicates a scheduling scheme of performing fixed resource assignment, and the setting of the SPS, for example, indicates assigned RB, MCS (Modulation and Coding Scheme), a subframe interval and the like.

The TTI bundling indicates a scheme of continuously transmitting retransmission data without feedback from the UE 200, and the setting of the TTI bundling, for example, indicates the presence or absence and the like of the setting of the TTI bundling.

The SRS indicates an uplink reference signal that is periodically transmitted from the UE 200 by frequency hopping, and the setting of the SRS indicates a cycle, a bandwidth, a hopping bandwidth, a cyclic shift, the number of transmission antenna ports and the like which are disclosed in TS 36.213 (v. 10.2.0) 8.2 UE sounding procedure.

The PUCCH indicates a control channel configured using RB corresponding to an end portion of UL CC, and the setting of the PUCCH, for example, indicates a parameter of a PUCCH resource. The parameter of the PUCCH resource indicates N (2) RB, N (1) CS and the like notified from an upper layer, which are disclosed in TS 36.211 (v. 10.1.0) 5.4 Physical uplink control channel, on the assumption that no cell ID is changed before and after a change in the UL CC.

Furthermore, the storage unit 130 stores, as context (that is, context correlated with DL CC) related to DL communication with the UE 200-1, a cell ID, a radio network temporary identifier (RNTI) and the like. The cell ID indicates an identifier for identifying a cell. The RNTI indicates a temporary identifier assigned to the UE 200-1.

Moreover, the storage unit 130 stores a CSG ID for identifying CSG (that is, the CSG#1) to which the HeNB 100-1 belongs.

The control unit 140 is configured by using a processor, for example, and controls various functions of the HeNB 100.

When the HeNB 100-1 is powered on, the control unit 140 measures (monitors) the state of a radio signal, which is received by the radio communication unit 110, for each CC on the basis of the information on the CC stored in the storage unit 130, and determines CC used around the HeNB 100-1. Then, the control unit 140 decides CC, which is different from the CC used around the HeNB 100-1, as CC to be used in the HeNB 100-1. In addition, the control unit 140 may periodically perform the monitoring even after deciding UL CC and DL CC.

After deciding the UL CC and the DL CC, the control unit 140 controls the radio communication unit 110 to periodically broadcast a system information block (SIB) including information indicating the UL CC and information indicating the DL CC to the cell of the HeNB 100-1. Furthermore, the control unit 140 controls the radio communication unit 110 to periodically broadcast a cell ID and a CSG ID of a cell (a CSG cell) constituted by the HeNB 100-1.

The control unit 140 has a scheduler function of assigning RB to the UE 200-1 with respect to each of the UL and the DL. Specifically, the control unit 140 decides RB to be assigned to the UE 200-1 from a plurality of RBs included in the UL CC and RB to be assigned to the UE 200-1 from a plurality of RBs included in the DL CC. Then, the control unit 140 controls the radio communication unit 110 to transmit the decided assigned RB of each of the UL and the DL to the UE 200-1 on PDCCH (Physical Downlink Control Channel).

At the time of a connection of the UE 200-1, the control unit 140 controls the radio communication unit 110 to transmit, to the UE 200-1, signaling (that is, an RRC Configuration message) of an upper layer including the setting of the SRS, the setting of the TTI bundling, the setting of the PUCCH, the RNTI and the like which are applied to the UE 200-1.

During execution of radio communication with the UE 200-1 after the connection of the UE 200-1, the control unit 140 measures an interference level received in the UL. When the interference level exceeds a predetermined level, the control unit 140 decides to change the UL CC. In the present embodiment, on the basis of a result of monitoring of a peripheral CC use status, the control unit 140 decides CC, which is not used around the HeNB 100-1, or CC with a low UL interference level as UL CC after change.

In addition, the control unit 140 may decide the UL CC after change on the basis of a result of the monitoring performed when the HeNB 100-1 is powered on, or may decide the UL CC after change on the basis of a result of monitoring that is periodically performed. Alternatively, after deciding to change the UL CC, the control unit 140 may perform monitoring again, and decide the UL CC after change on the basis of a result of the monitoring. Hereinafter, a description will be provided for an example of deciding to change the UL CC and then performing monitoring again.

In this case, the control unit 140 decides the UL CC after change such that a bandwidth of the UL CC after change is equal to a bandwidth of the UL CC before change. In the case in which the bandwidth of the UL CC after change is equal to the bandwidth of the UL CC before change, even when the UL CC is changed, it is possible to maintain context correlated with the UL CC.

The control unit 140 decides the UL CC after change and a change timing of the UL CC. The change timing, for example, is decided by a radio frame number and/or a subframe number. In addition, one radio frame includes 10 subframes.

When the control unit 140 decides the UL CC after change and the change timing of the UL CC, the control unit 140 controls the radio communication unit 110 to transmit UL CC information indicating the UL CC after change and timing information indicating the change timing of the UL CC. The UL CC information, for example, includes information indicating a center frequency of the UL CC after change and information indicating a bandwidth of the UL CC after change. The timing information, for example, includes a radio frame number and/or a subframe number by which the UL CC is changed.

The control unit 140 controls the radio communication unit 110 to transmit, to the UE 200-1, signaling (that is, an RRC Reconfiguration message) of the upper layer including the UL CC information and the timing information. According to such a transmission method, it is possible to transmit the information individually to each of the UE 200, so that it is possible to transmit different UL CC information and timing information to each of the UE 200. In addition, it is preferable that the change timing of the UL CC is after a timing at which ACK from the UE for the RRC Reconfiguration message is expected to be acquired.

Alternatively, the control unit 140 controls the radio communication unit 110 to perform broadcast transmission of the UL CC information and the timing information into the SIB. According to such a transmission method, it is possible to simultaneously transmit the UL CC information and the timing information to a plurality of UEs 200, so that it is possible to reduce overhead.

After transmitting the UL CC information and the timing information, the control unit 140 changes UL CC to the UL CC after change, which corresponds to the UL CC information, at the timing (the radio frame number and/or the subframe number) corresponding to the timing information.

After changing the UL CC, the control unit 140 continues radio communication with the UE 200-1. As described above, since the bandwidth of the UL CC after change is equal to the bandwidth of the UL CC before change, even when the UL CC is changed, the UL communication is continued with maintaining the context correlated with the UL CC. Furthermore, since no DL CC is changed, the DL communication is continued with maintaining the context correlated with the DL CC.

Figure 4:
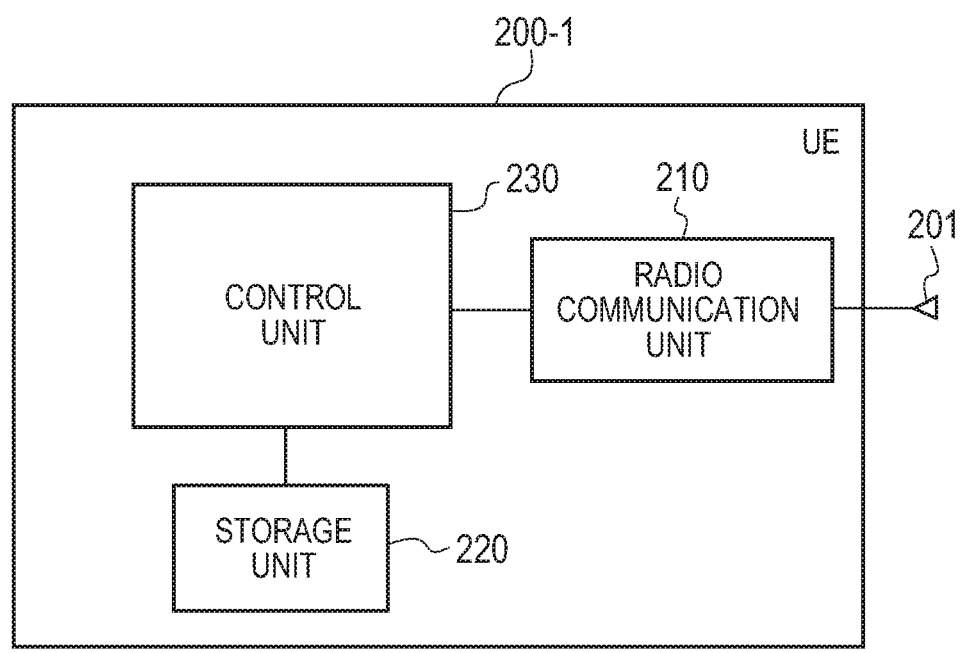
FIG. 4 is a block diagram of UE according to the first embodiment to the third embodiment.

Next, the configuration of the UE 200 is explained. Since the UE 200-1 to the UE 200-3 have the same configuration, the configuration of the UE 200-1 will be described below. FIG. 4 is a block diagram of the UE 200-1.

As shown in FIG. 4, the UE 200 includes an antenna 201, a radio communication unit 210, a storage unit 220, and a control unit 230.

The radio communication unit 210 is configured to perform radio communication through the antenna 201. For transmission, the radio communication unit 210 performs up-conversion, amplification and the like on a baseband signal input from the control unit 230, and outputs a radio signal from the antenna 201. For reception, the radio communication unit 210 performs amplification, down-conversion and the like on a received signal input from the antenna 201, and then outputs a baseband signal to the control unit 230.

The storage unit 220 is configured by using a memory, for example, and stores various types of information used for control and the like by the control unit 230. Furthermore, the storage unit 220 stores a CSG ID of CSG (that is, the CSG#1) including the UE 200-1.

The storage unit 220 stores context related to radio communication with the HeNB 100-1. Specifically, the storage unit 220 stores, as context (that is, the context related to the UL CC) related to the UL communication with the HeNB 100-1, the state of HARQ, the setting of the SPS, the setting of the TTI bundling, the setting of the SRS, the setting of the PUCCH and the like. Furthermore, the storage unit 220 stores, as context (that is, the context related to the DL CC) related to the DL communication with the HeNB 100-1, the cell ID, the RNTI and the like.

The control unit 230 is configured by using a processor, for example, and controls various functions of the UE 200-1.

The control unit 230 measures the state of a radio signal received by the radio communication unit 210, and acquires a cell ID and a CSG ID included in the radio signal. Then, the control unit 230 decides a cell (the cell constituted by the HeNB 100-1 in the present embodiment), in which radio communication is possible and a CSG ID coinciding with the CSG ID stored in the storage unit 220 is transmitted, as a serving cell, and attempts a connection. Furthermore, the control unit 230 acquires SIB received from the HeNB 100-1 by the radio communication unit 210, and determines UL CC and DL CC which are used in the HeNB 100-1, on the basis of the SIB.

When information indicating the setting of the SRS, the setting of the TTI bundling, the setting of the PUCCH, the RNTI and the like is received from the HeNB 100-1 by the radio communication unit 210, the control unit 230 controls the storage unit 220 to store the received information.

After a connection to the HeNB 100-1, the control unit 230 determines assigned RB on the basis of assignment information received by the radio communication unit 210 on the PDCCH, and controls the radio communication unit 210 to perform radio communication (data transmission/reception) by using the assigned RB.

When the radio communication unit 210 receives the UL CC information and the timing information from the HeNB 100-1 during the radio communication with the HeNB 100-1, the control unit 230 changes UL CC to the UL CC after change, which corresponds to the UL CC information, at the timing (the radio frame number and/or the subframe number) corresponding to the timing information.

After changing the UL CC, the control unit 230 continues the radio communication with the HeNB 100-1. As described above, since the bandwidth of the UL CC after change is equal to the bandwidth of the UL CC before change, even when the UL CC is changed, the UL communication is continued with maintaining the context correlated with the UL CC. Furthermore, since no DL CC is changed, the DL communication is continued with maintaining the context correlated with the DL CC.

Next, the operation of the mobile communication system according to the present embodiment will be described in sequence of the operation of the HeNB 100-1 and the operation of the UE 200-1. Here, a description will be provided for an operation in which UL CC is changed when radio communication is performed between the HeNB 100-1 and the UE 200-1.

Figure 5:
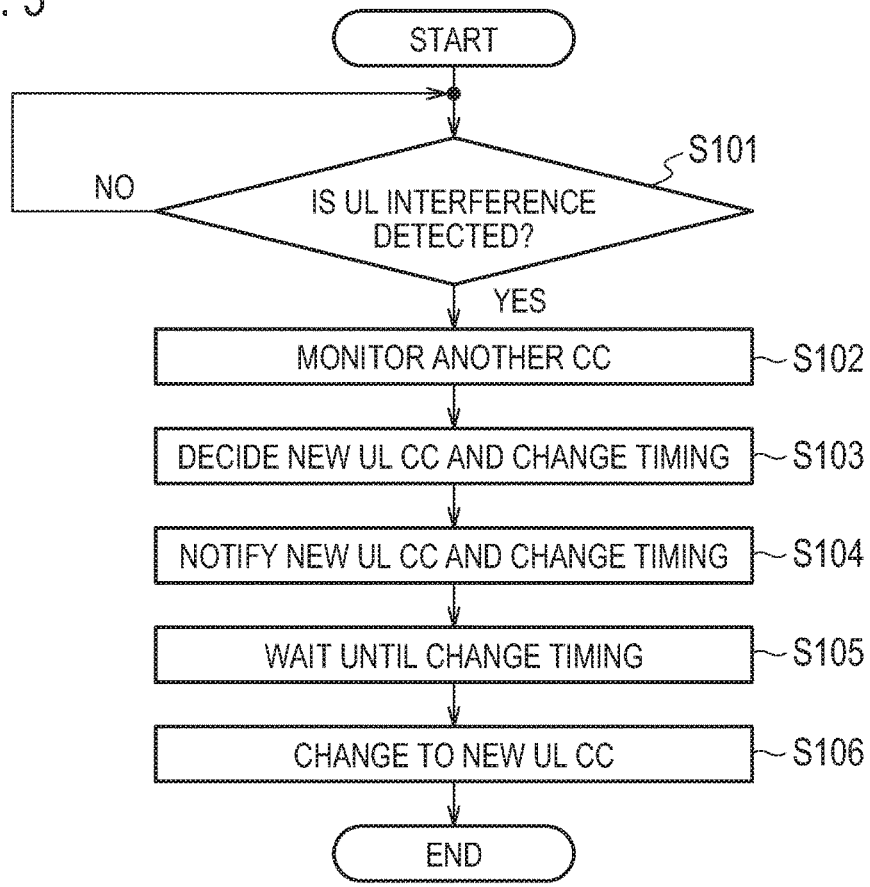
FIG. 5 is an operation flow diagram of the HeNB according to the first embodiment.

FIG. 5 is an operation flow diagram of the HeNB 100-1 according to the present embodiment.

As shown in FIG. 5, in step S101, the control unit 140 measures an interference level in the UL. When the interference level exceeds a predetermined level (step S101; YES), the control unit 140 decides to change UL CC.

In step S102, the control unit 140 monitors a peripheral CC use status.

In step S103, on the basis of a result of the monitoring, the control unit 140 decides CC, which is not used around the HeNB 100-1, or CC with a low UL interference level as UL CC after change. Furthermore, the control unit 140 decides the UL CC after change and a change timing of the UL CC. The change timing, for example, is decided by a radio frame number and/or a subframe number.

In step S104, when the control unit 140 decides the UL CC after change and the change timing of the UL CC, the control unit 140 controls the radio communication unit 110 to transmit UL CC information indicating the UL CC after change and timing information indicating the change timing of the UL CC.

In step S105, the control unit 140 enters await state until a timing corresponding to the timing information is reached.

In step S106, the control unit 140 changes CC to the UL CC after change, which corresponds to the UL CC information, at the timing (the radio frame number and/or the subframe number) corresponding to the timing information. After changing the UL CC, the control unit 140 controls radio communication with the UE 200-1 to be continued. As described above, since the bandwidth of the UL CC after change is equal to the bandwidth of the UL CC before change, even when the UL CC is changed, the UL communication is continued with maintaining the context correlated with the UL CC. Furthermore, since no DL CC is changed, the DL communication is continued with maintaining the context correlated with the DL CC.

Figure 6:
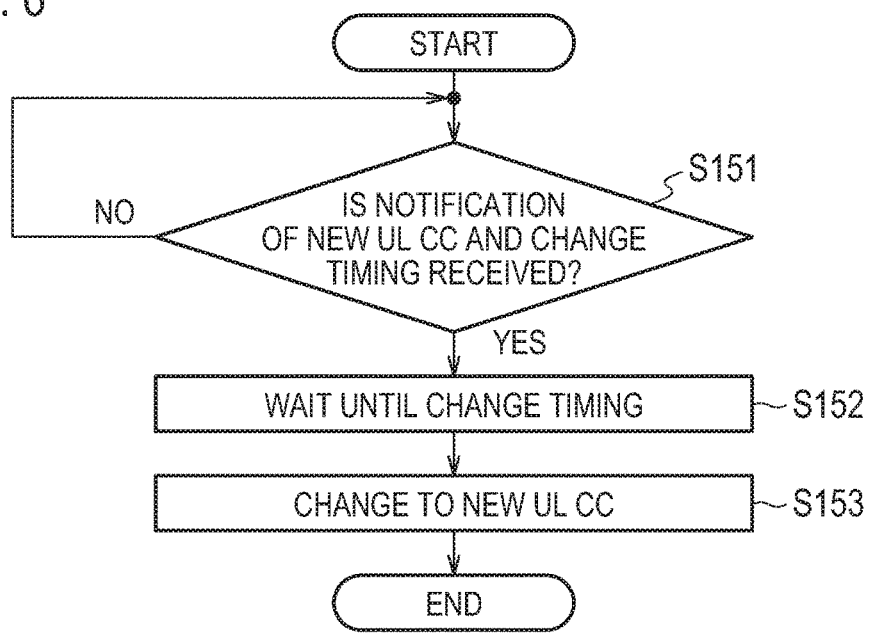
FIG. 6 is an operation flow diagram of the UE according to the first embodiment.

FIG. 6 is an operation flow diagram of the UE 200-1 according to the present embodiment.

As shown in FIG. 6, in step S151, the control unit 230 confirms whether the radio communication unit 210 receives the UL CC information and the timing information from the HeNB 100-1. When the radio communication unit 210 receives the UL CC information and the timing information (step S151; YES), the procedure proceeds to step S152.

In step S152, the control unit 230 enters await state until a timing corresponding to the timing information is reached.

In step S153, the control unit 230 changes CC to the UL CC after change, which corresponds to the UL CC information, at the timing (the radio frame number and/or the subframe number) corresponding to the timing information. After changing the UL CC, the control unit 230 continues radio communication with the HeNB 100-1. As described above, since the bandwidth of the UL CC after change is equal to the bandwidth of the UL CC before change, even when the UL CC is changed, the UL communication is continued with maintaining the context correlated with the UL CC. Furthermore, since no DL CC is changed, the DL communication is continued with maintaining the context correlated with the DL CC.

As described above, according to the present embodiment, during execution of radio communication, the HeNB 100-1 and the UE 200-1 change the UL CC of a pair of the UL CC and the DL CC to another CC. As a result, the interference in the UL is avoided.

In the present embodiment, before changing the UL CC, the HeNB 100-1 transmits the UL CC information indicating the UL CC after change and the UE 200-1 receives the UL CC information from the HeNB 100-1. As a result, it is possible to notify the UE 200-1 of the UL CC after change in advance.

In the present embodiment, before changing the UL CC, the HeNB 100-1 transmits the timing information indicating the timing at which the UL CC is changed, and the UE 200-1 receives the timing information from the HeNB 100-1. As a result, the HeNB 100-1 can designate the change timing of the UL CC with respect to the UE 200-1.

In the present embodiment, during execution of radio communication, the HeNB 100-1 and the UE 200-1 change the UL CC to another CC while maintaining the bandwidth of the UL CC. As a result, it is possible to continue the UL communication with maintaining context correlated with the UL CC.

In the present embodiment, during execution of radio communication, the HeNB 100-1 and the UE 200-1 change the UL CC to another CC while maintaining DL CC. As a result, it is possible to continue the DL communication with maintaining context correlated with the DL CC.

[Second Embodiment]

Hereinafter, a second embodiment will be described while focusing on the differences from the first embodiment. In the present embodiment, after UL CC is changed, when interference in UL is sufficiently reduced in CC before change, the CC after change is returned to the CC before change.

Figure 7:
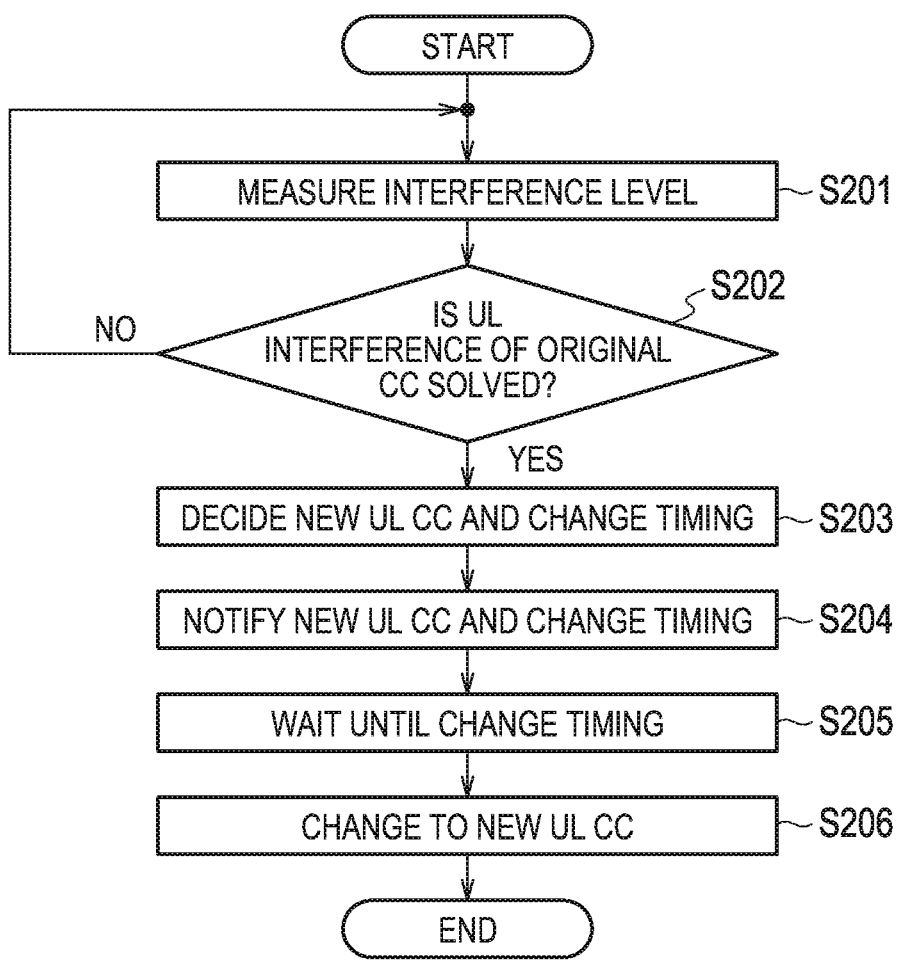
FIG. 7 is an operation flow diagram of the HeNB according to the second embodiment.

Next, the operation of the HeNB 100-1 according to the present embodiment will be described. Hereinafter, a description will be provided for an operation after the HeNB 100-1 and the UE 200-1 change UL CC. FIG. 7 is an operation flow diagram of the HeNB 100-1 according to the present embodiment.

As shown in FIG. 7, in step S201, the control unit 140 measures an interference level received in CC (UL CC) before change.

In step S202, the control unit 140 confirms whether the interference level is smaller than a predetermined level. When the interference level is not smaller than the predetermined level (step S202; YES), the procedure proceeds to step S203. On the other hand, when the interference level is not smaller than the predetermined level (step S202; NO), the procedure returns to step S201.

In step S203, the control unit 140 decides the CC before change as new UL CC. Furthermore, the control unit 140 decides the new UL CC and a change timing of the UL CC.

In step S204, when the control unit 140 decides the new UL CC and the change timing of the UL CC, the control unit 140 controls the radio communication unit 110 to transmit UL CC information indicating the new UL CC and timing information indicating the change timing of the UL CC.

In step S205, the control unit 140 enters await state until a timing corresponding to the timing information is reached.

In step S206, the control unit 140 changes CC to the UL CC after change, which corresponds to the UL CC information, at the timing (the radio frame number and/or the subframe number) corresponding to the timing information. After changing the UL CC, the control unit 140 controls radio communication with the UE 200-1 to be continued. Since the bandwidth of the UL CC after change is equal to the bandwidth of UL CC before change, even when the UL CC is changed, the UL communication is continued with maintaining context correlated with the UL CC. Furthermore, since no DL CC is changed, the DL communication is continued with maintaining the context correlated with the DL CC.

[Third Embodiment]

Hereinafter, a third embodiment will be described while focusing on differences from the first embodiment. In the aforementioned first embodiment, the timing information is transmitted from the HeNB 100-1 to the UE 200-1. On the other hand, in the third embodiment, the HeNB 100-1 and the UE 200-1 share (store) in advance a rule regarding the change timing of UL CC, so that the transmission and the reception of the timing information is omitted.

The rule regarding the change timing, for example, is a rule in which UL CC is changed in a front subframe included in a next radio frame of a radio frame in which the transmission and the reception of the UL CC information was performed. Alternatively, the rule regarding the change timing may be a rule in which UL CC is changed in a subframe after N subframes of a subframe in which the transmission and the reception of the UL CC information was performed.

Next, the operation of the mobile communication system according to the present embodiment will be described in sequence of the operation of the HeNB 100-1 and the operation of the UE 200-1. Hereinafter, a description will be provided for an operation in which UL CC is changed when radio communication is performed between the HeNB 100-1 and the UE 200-1.

Figure 8:
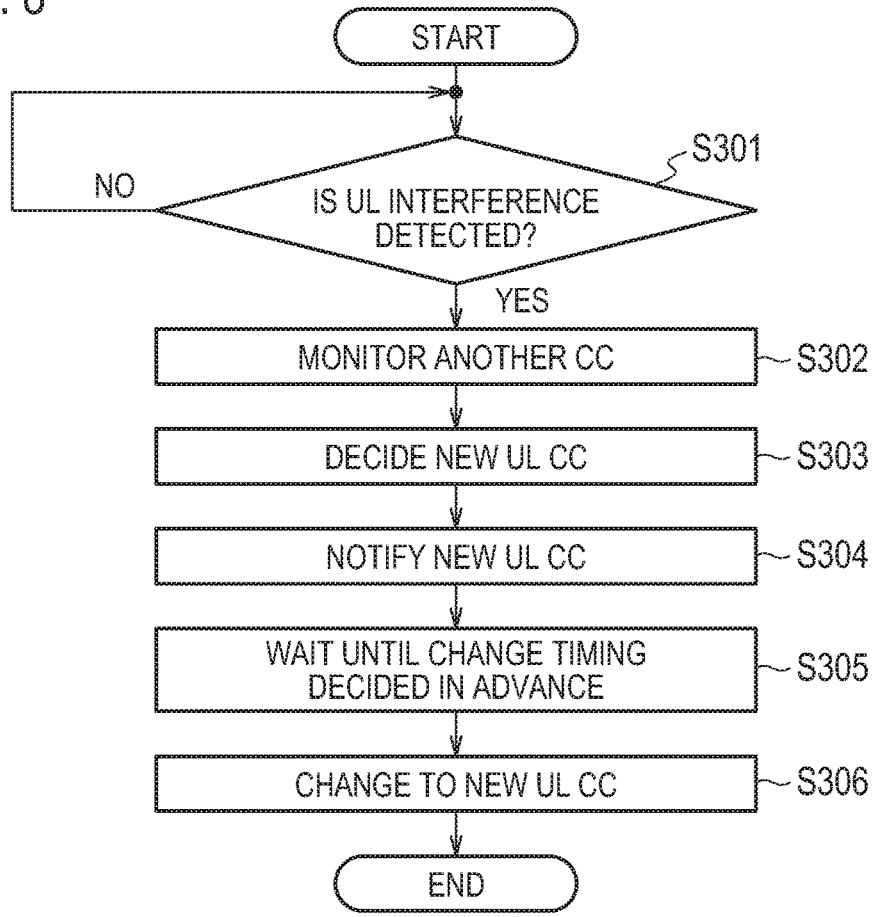
FIG. 8 is an operation flow diagram of the HeNB according to the third embodiment.

FIG. 8 is an operation flow diagram of the HeNB 100-1 according to the present embodiment.

As shown in FIG. 8, in step S301, the control unit 140 measures an interference level received in UL. When the interference level exceeds a predetermined level (step S301; YES), the control unit 140 decides to change UL CC.

In step S302, the control unit 140 monitors a peripheral CC use status.

In step S303, on the basis of a result of the monitoring, the control unit 140 decides CC, which is not used around the HeNB 100-1, or CC with a low UL interference level as UL CC after change.

Instep S304, when the control unit 140 controls the radio communication unit 110 to transmit UL CC information indicating the UL CC after change.

In step S305, the control unit 140 enters await state until a timing decided by the rule regarding the change timing is reached.

In step S306, at the timing decided by the rule regarding the change timing, CC is changed to the UL CC after change, which corresponds to the UL CC information. After changing the UL CC, the control unit 140 controls radio communication with the UE 200-1 to be continued.

Figure 9:
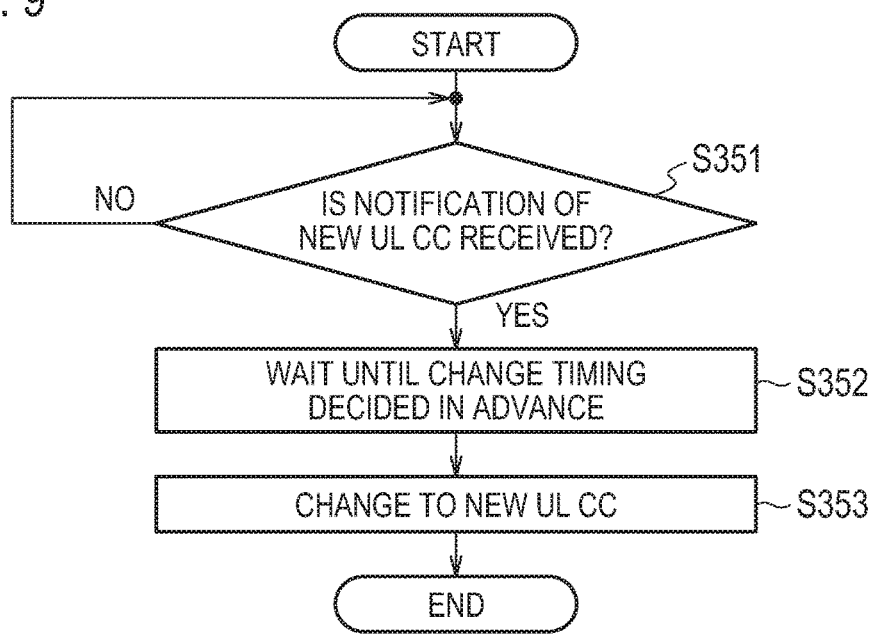
FIG. 9 is an operation flow diagram of the UE according to the third embodiment.

FIG. 9 is an operation flow diagram of the UE 200-1 according to the present embodiment.

As shown in FIG. 9, in step S351, the control unit 230 confirms whether the radio communication unit 210 receives the UL CC information from the HeNB 100-1. When the radio communication unit 210 receives the UL CC information (step S351; YES), the procedure proceeds to step S352.

In step S352, the control unit 230 enters await state until the timing decided by the rule regarding the change timing is reached.

In step S353, the control unit 230 changes CC to the UL CC after change, which corresponds to the UL CC information, at the timing decided by the rule regarding the change timing. After changing the UL CC, the control unit 230 continues radio communication with the HeNB 100-1.

As described above, according to the present embodiment, the HeNB 100-1 transmits the UL CC information and then changes UL CC at the timing decided in advance, and the UE 200-1 receives the UL CC information and then changes the UL CC at the timing decided in advance. As a result, it is possible to omit timing information, so that it is possible to reduce overhead.

[Other Embodiments]

While the present invention has been described by way of each of the foregoing embodiments, as described above, it should not be understood that the statements and drawings forming apart of this disclosure limit the invention. From this disclosure, a variety of alternate embodiments, examples, and applicable techniques will become apparent to one skilled in the art.

Each of the aforementioned embodiments has described an example in which the UL CC is changed by using interference detection in the UL as a trigger. However, the UL CC may be changed by using congestion detection in the UL as a trigger. That is, when congestion occurs in the UL, the UL CC is changed to UL CC with a wide bandwidth, so that it is possible to solve congestion in the UL due to an increase in UL communication capacity. In addition, the presence or absence of the congestion in the UL, for example, can be determined according to whether an RB use rate in the UL exceeds a predetermined value.

Furthermore, the aforementioned embodiment has described the HeNB, which is a kind of a base station, as an example. However, as well as the HeNB, a macro base station (MeNB) or a pico base station (PeNB) may be employed as a base station according to the present invention.

Moreover, in the future, it is also assumed to divide one CC and deal with each divided carrier as new CC. However, a component carrier (CC) in the present specification is assumed to include such new CC.

Thus, it should be understood that the present invention includes various embodiments and the like that are not described herein.

The invention claimed is:

1. A user terminal comprising:
a controller configured to perform radio communication by using a plurality of component carriers including a first component carrier and a second component carrier, the first component carrier being configured to transmit Physical Unlink Control Channel (PUCCH), the second component carrier being configured to transmit downlink and not to transmit the PUCCH; and
a receiver configured to receive component carrier change information from a base station, wherein the controller is further configured to change the first component carrier to another component carrier while maintaining the second component carrier and identification information on the second component carrier without performing reconnection in response to reception of the component carrier change information.

2. The user terminal of claim 1, wherein
the receiver is further configured to receive time information from the base station, the time information indicating a predetermined time period from a time point when the receiver receives the component carrier change information to a time point when the controller should perform a predetermined procedure related to changing the first component carrier to the another component carrier.

3. A communication control method used in a user terminal comprising:
controlling to perform radio communication by using a plurality of component carriers including a first component carrier and a second component carrier, the first component carrier being configured to transmit Physical Unlink Control Channel (PUCCH), the second component carrier being configured to transmit downlink and not to transmit the PUCCH:

receiving component carrier change information from a base station, and controlling, in response to reception of the component carrier change information, to change the first component carrier to another component carrier while maintaining the second component carrier and identification information on the second component carrier without performing reconnection.

4. The communication control method of claim 3, comprising:

receiving time information from the base station, the time information indicating a predetermined time period from a time point when the receiver receives the component carrier change information to a time point when the controller should perform a predetermined procedure related to changing the first component carrier to the another component carrier.

5. A processor and memory provided in a user terminal, wherein the memory includes instructions stored therein, the processor executes the stored instructions to cause the processor to:

control performing radio communication by using a plurality of component carriers including a first component carrier and a second component carrier, the first component carrier being configured to transmit Physical Uplink Control Channel (PUCCH), the second component carrier being configured to transmit downlink and not to transmit the PUCCH;

receive component carrier change information from a base station, and control, in response to reception of the component carrier change information, to change the first component carrier to another component carrier while maintaining the second component carrier and identification information on the second component carrier without performing reconnection.

6. The processor of claim 5, wherein the processor executes a process of receiving receive time information from the base station, the time information indicating a predetermined time period from a time point when the receiver receives the component carrier change information to a time point when the controller should perform a predetermined procedure related to changing the first component carrier to the another component carrier.

* * * * *